United States Patent
Clark et al.

(10) Patent No.: US 10,822,985 B2
(45) Date of Patent: Nov. 3, 2020

(54) INTERNAL COOLING CIRCUIT FOR BLADE OUTER AIR SEAL FORMED OF LAMINATE

(71) Applicant: United Technologies Corporation, Farmington, CT (US)

(72) Inventors: Thomas E. Clark, Sanford, ME (US); Winston Gregory Smiddy, Saco, ME (US); Daniel J. Whitney, Topsham, ME (US); William M. Barker, North Andover, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 402 days.

(21) Appl. No.: 16/116,140

(22) Filed: Aug. 29, 2018

(65) Prior Publication Data
US 2020/0072069 A1    Mar. 5, 2020

(51) Int. Cl.
F01D 11/08    (2006.01)

(52) U.S. Cl.
CPC .......... F01D 11/08 (2013.01); *F05D 2230/90* (2013.01); *F05D 2260/20* (2013.01); *F05D 2300/6033* (2013.01)

(58) Field of Classification Search
CPC ...... F01D 25/005; F01D 25/12; F01D 25/246; C04B 35/62868; C04B 35/80; C04B 2235/5244; C04B 2237/18; B32B 18/00; F05D 2230/90; F05D 2240/11; F05D 2250/11; F05D 2250/13; F05D 2250/323; F05D 2250/324; F05D 2260/20; F05D 2260/204; F05D 2300/6033; F05D 2300/6034
See application file for complete search history.

(56) References Cited

U.S. PATENT DOCUMENTS

| | | | |
|---|---|---|---|
| 7,597,533 B1 * | 10/2009 | Liang | F01D 9/02 415/116 |
| 7,670,108 B2 * | 3/2010 | Liang | F01D 11/005 415/115 |
| 7,704,039 B1 * | 4/2010 | Liang | F01D 9/04 415/116 |

(Continued)

FOREIGN PATENT DOCUMENTS

| | | |
|---|---|---|
| EP | 3181826 A1 | 6/2017 |
| EP | 3323997 A1 | 5/2018 |

OTHER PUBLICATIONS

Partial European Search Report for EP Application No. 19194470.1 dated Jan. 8, 2020.

(Continued)

*Primary Examiner* — Igor Kershteyn
(74) *Attorney, Agent, or Firm* — Carlson, Gaskey & Olds, P.C.

(57) ABSTRACT

A method of forming a gas turbine engine component includes the steps of (a) forming an intermediate portion, (b) forming cooling circuit structure into at least an outer layer of the intermediate portion, (c) providing an outer layer over the formed cooling circuits to close off the cooling circuits, such that there are laminate on both a radially inner and a radially outer side of the cooling circuits, and (d) forming an inlet and an outlet to the cooling circuits through the outer layer. A gas turbine engine is also disclosed.

17 Claims, 10 Drawing Sheets

(56) References Cited

U.S. PATENT DOCUMENTS

| | | | |
|---|---|---|---|
| 7,988,410 B1* | 8/2011 | Liang | F01D 9/04 |
| | | | 415/115 |
| 8,177,492 B2* | 5/2012 | Knapp | F01D 5/18 |
| | | | 415/173.1 |
| 9,151,179 B2* | 10/2015 | Lacy | F01D 25/12 |
| 9,611,754 B2* | 4/2017 | Taylor | F01D 11/08 |
| 9,752,440 B2* | 9/2017 | Miranda | F01D 5/18 |
| 2005/0058534 A1 | 3/2005 | Lee et al. | |
| 2017/0101873 A1 | 4/2017 | Morgan et al. | |
| 2017/0175573 A1* | 6/2017 | Benjamin | F01D 25/12 |
| 2018/0135446 A1* | 5/2018 | Propheter-Hinckley | |
| | | | F01D 5/284 |
| 2018/0223681 A1 | 8/2018 | Gallier et al. | |

OTHER PUBLICATIONS

European Search Report for EP Application No. 19194470.1 dated Jun. 29, 2020.

* cited by examiner

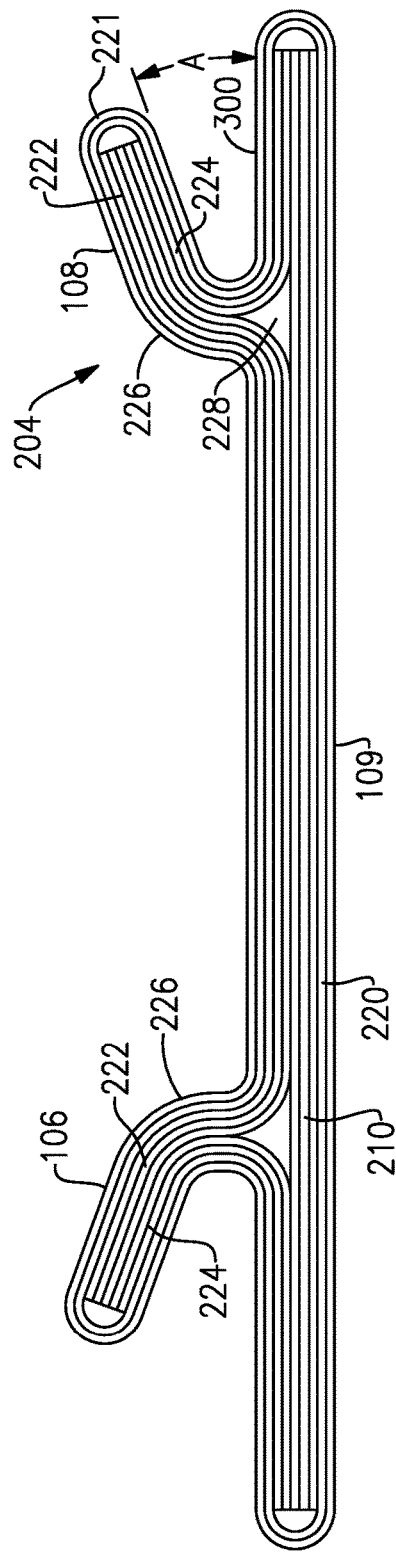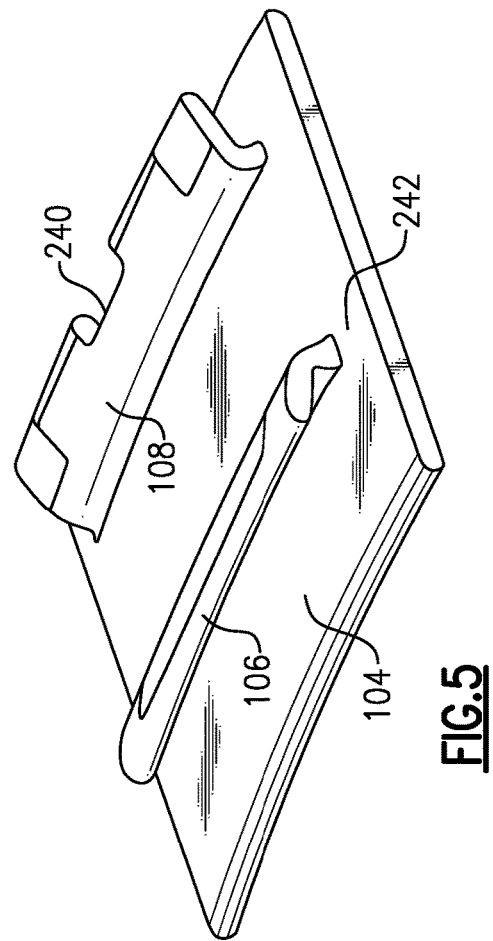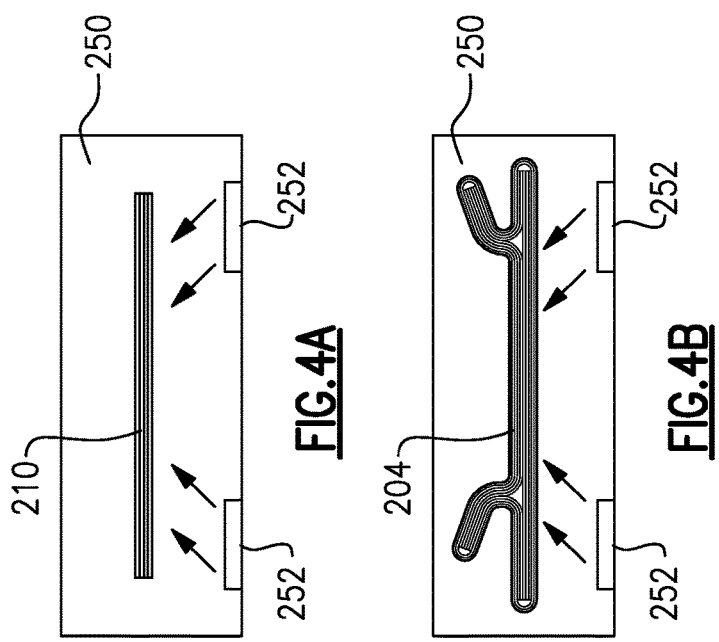

US 10,822,985 B2

INTERNAL COOLING CIRCUIT FOR BLADE OUTER AIR SEAL FORMED OF LAMINATE

BACKGROUND

This application relates to a method and apparatus, for forming a gas turbine engine component from laminate, but having internal cooling circuits.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

Blade outer air seals have been proposed made of ceramic matrix composite fiber layers

SUMMARY

In a featured embodiment, a method of forming a gas turbine engine component includes the steps of (a) forming an intermediate portion, (b) forming cooling circuit structure into at least an outer layer of the intermediate portion, (c) providing an outer layer over the formed cooling circuits to close off the cooling circuits, such that there are laminate on both a radially inner and a radially outer side of the cooling circuits, and (d) forming an inlet and an outlet to the cooling circuits through the outer layer.

In another embodiment according to the previous embodiment, the component is a blade outer air seal.

In another embodiment according to any of the previous embodiments, the intermediate portion includes a plurality of laminate.

In another embodiment according to any of the previous embodiments, at least one inner layer is also added inward of the intermediate portion in step (c).

In another embodiment according to any of the previous embodiments, an overwrap layer provides both the inner and outer layer.

In another embodiment according to any of the previous embodiments, the intermediate portion and the layers are formed of a ceramic matrix composite.

In another embodiment according to any of the previous embodiments, step (b) is performed by an ultrasonic machine.

In another embodiment according to any of the previous embodiments, step (d) is performed by an ultrasonic machine.

In another embodiment according to any of the previous embodiments, there are a plurality of separate cooling circuits formed within the intermediate layer.

In another embodiment according to any of the previous embodiments, there is an individual inlet and an individual outlet for each of the plurality of cooling circuits.

In another embodiment according to any of the previous embodiments, the cooling circuit has a non-rectangular shape.

In another embodiment according to any of the previous embodiments, the intermediate portion includes a plurality of laminate.

In another embodiment according to any of the previous embodiments, at least one inner layer is also added inward of the intermediate portion in step (c).

In another embodiment according to any of the previous embodiments, an overwrap layer provides both the inner and outer layer.

In another embodiment according to any of the previous embodiments, the intermediate portion and the layers are formed of a ceramic matrix composite.

In another embodiment according to any of the previous embodiments, step (b) is performed by an ultrasonic machine.

In another embodiment according to any of the previous embodiments, step (d) is performed by an ultrasonic machine.

In another embodiment according to any of the previous embodiments, there are a plurality of separate cooling circuits formed within the intermediate layer.

In another embodiment according to any of the previous embodiments, the cooling circuit has a non-rectangular shape.

In another featured embodiment, a gas turbine engine includes a compressor section and a turbine section. The turbine section includes at least one rotor and at least one blade extending radially outwardly from the rotor to a radially outer tip. A blade outer air seal assembly is positioned radially outwardly of the radially outer tip of the blade. The blade outer air seal has forward and aft hooks. The forward and aft hooks are supported on forward and aft seal hooks of an attachment. The blade outer air seal is formed of a plurality of laminate layered with a central web formed of a plurality of laminate members including an inner reinforcement member, and an outer overwrap that wraps around the inner reinforcement member. The blade outer air seal forward of a plurality of laminate layers, with internal cooling circuits formed in one of the layers, with at least one other layer radially outward of the at least one layer, and closing off the internal cooling circuit.

These and other features may be best understood from the following drawings and specification.

BRIEF DESCRIPTION OF THE DRAWINGS

FIG. 3B shows an alternative blade outer air seal.

FIG. 4A shows a first method step to form a blade outer air seal.

FIG. 4B shows a subsequent step to form a blade outer air seal.

FIG. 5 shows another embodiment of a blade outer air seal.

DETAILED DESCRIPTION

Figure 1:
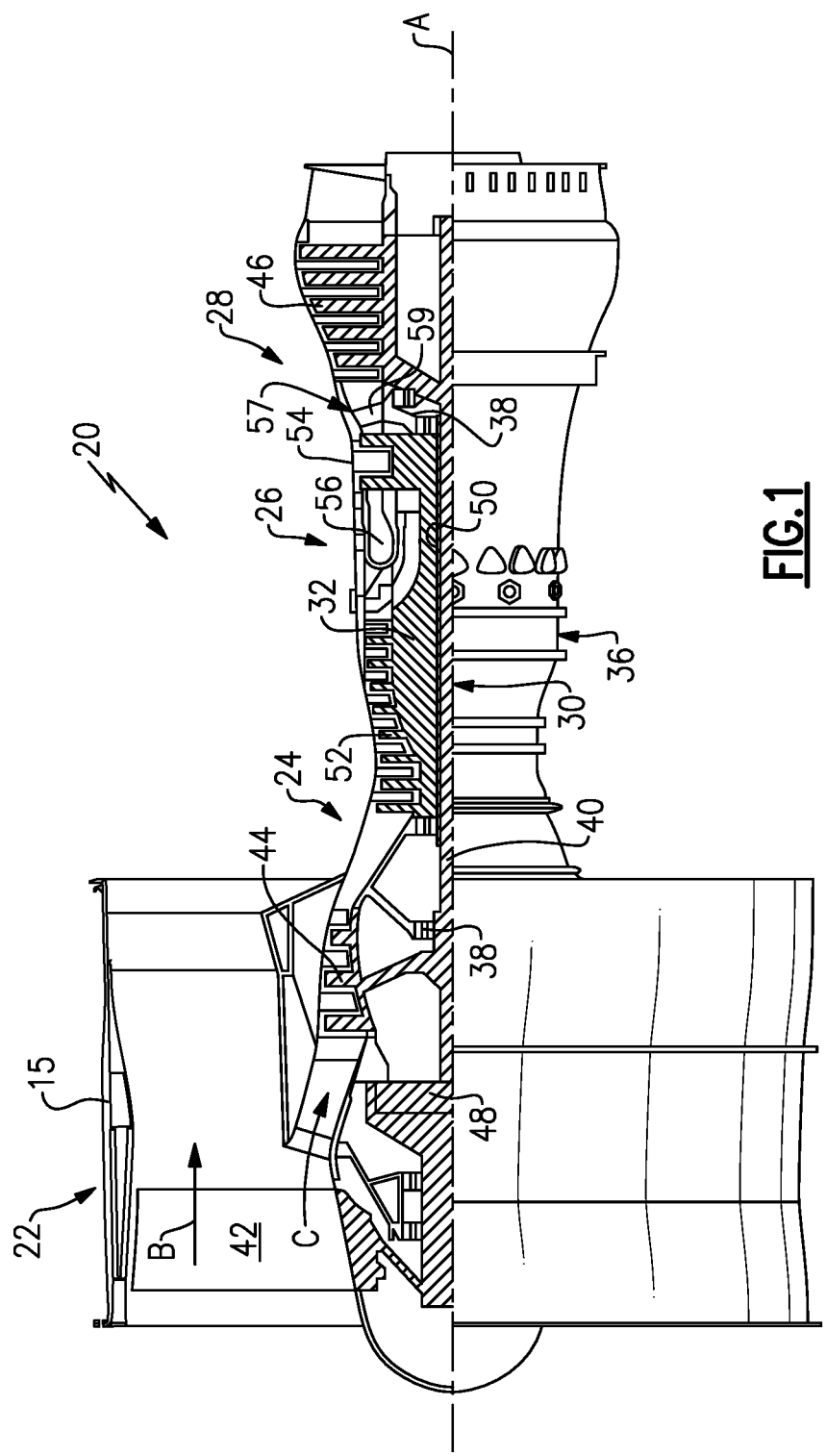
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
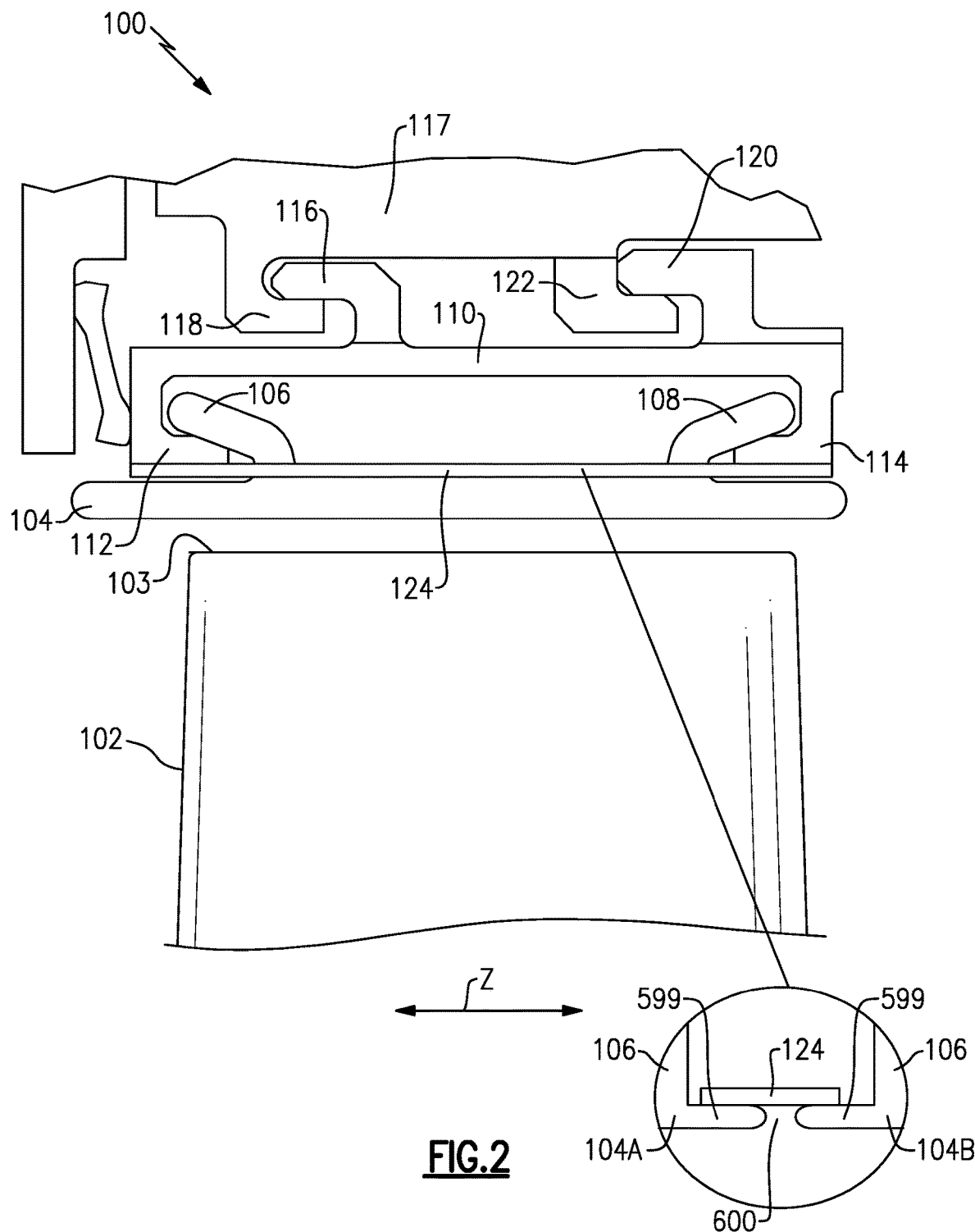
FIG. 2 shows a turbine section that may be part of the FIG. 1 engine.

FIG. 2 shows a turbine section 100, which may be incorporated into a gas turbine engine such as the one shown in FIG. 1. However, it should be understood that the turbine section 100 could be utilized in other gas turbine engines, and even gas turbine engines not having a fan section at all.

A turbine blade 102 has a radially outer tip 103 that is spaced from a blade outer air seal ("BOAS") 104. The BOAS may be formed of a ceramic matrix composite ("CMC") or a monolithic ceramic material. A forward hook 106 and an aft hook 108 are formed on the BOAS 104. A support block 110 includes a rearwardly facing forward hook 112 supporting forward hook 106 and a forwardly facing aft hook 114 supporting aft hook 108.

As shown, the attachment block 110 is supported on a static support or engine case 117. Case 117 has a rearwardly facing forward hook 118 supporting forwardly facing forward hook 116 of the attachment block 110. The case 117 has a rearwardly facing aft hook 122 supporting a forwardly facing aft hook 120 on the attachment block. Case 117 may extend for a full 360° about a rotational axis Z of blade 102.

It should be understood that the arrangement of the hooks 118 and 120 and 116 and 118 could be reversed such that hooks 118 and 122 face forwardly and hooks 116 and 120 face rearwardly. However, in one aspect of this disclosure, the hooks 116 and 120 face in a common axial direction and the hooks 118 and 122 face in an opposed axial direction.

A wedge seal 124 can also be seen. A circled detail is shown, wherein the wedge seal 124 can be seen to span a circumferential gap 600 to seal between circumferentially adjacent BOAS 104A and 104B. As shown the BOAS have a surface 599 circumferentially outward of hooks 106 (hooks 108 would look the same) that support the wedge seal 124.

Figure 3A:
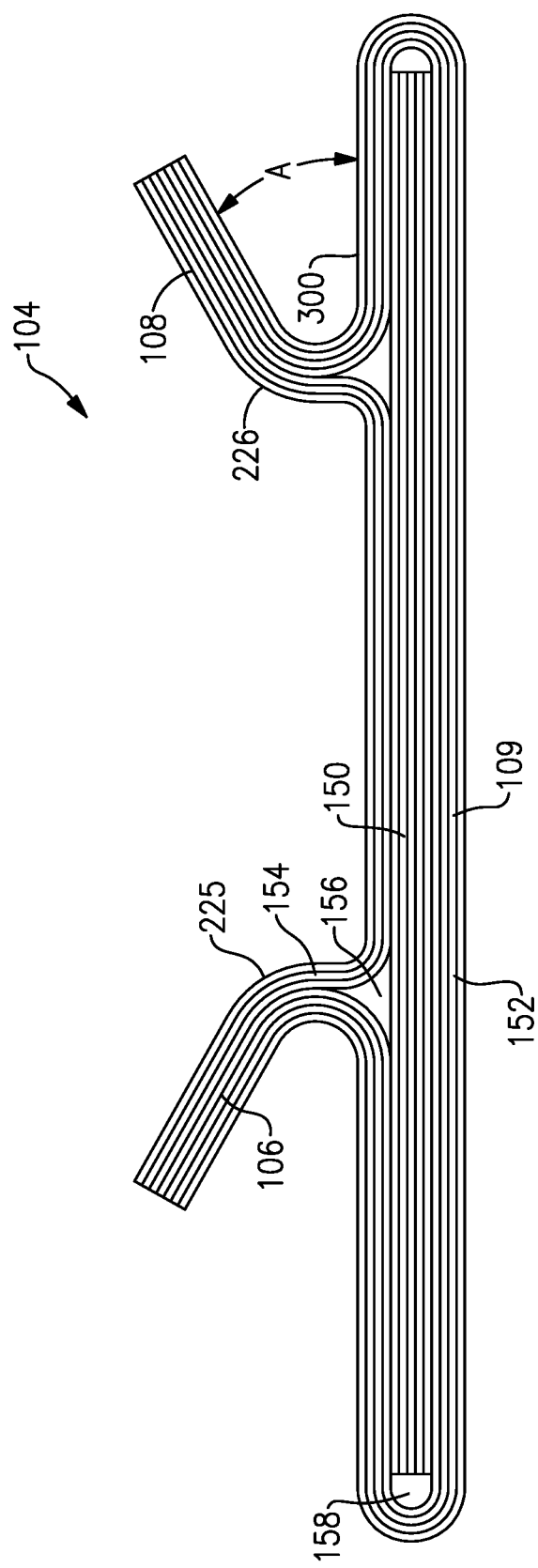
FIG. 3A is a cross-sectional view through a blade outer air seal.

FIG. 3A shows the BOAS 104 having hooks 106 and 108 and a central web 109.

The BOAS 104 is formed of a ceramic matrix composite ("CMC") material. The BOAS is formed of a plurality of CMC laminates. The laminates may be silicon carbide fibers, formed into a woven fabric in each layer. The fibers may be coated by a boron nitride.

Generally in the prior art there have been only a few laminate in a central web 109. In this embodiment BOAS 104 is shown to have a central reinforcement laminate 150 including a plurality of layers. An overwrap 152 also includes a plurality of layers or laminates, and spans a central web 109 which is defined axially between hooks 106 and 108, and axially outwardly of both hooks. The overwrap layer 152 also extends back to form a radially inner portion of the hooks 106 and 108. A hook backing portion 154 is secured to the overwrap portion 152 to complete the hooks 106 and 108. Spaces 156 and 158 are filled with loose fibers, as will be explained in more detail below.

FIG. 3B shows a BOAS embodiment 204. As shown, there are central reinforcement laminate 210 and outer overwrap plies 220. There are hook reinforcement plies 222 extending across the web 109 and into each of the hook areas. There are also inner front end aft plies 224 forming radially inner portions of the hooks 106 and 108.

Each of structures 150/152/154/210/220/224 and 224 are shown to include plural layers or laminates.

The use of several laminates in the web 109 provides benefits. However, it is generally desirable to add additional material to make the laminates more stiff than their free woven fiber state. Thus, a process known as densification is utilized to increase the density of the laminate material after assembly. If too many laminate are formed in the central web, the radially more central laminate may not be adequately densified.

Thus, in a method step as shown in FIG. 4A the reinforcement plies in member 210 may be initially stiffened in a densification chamber 250 as a separate densification process. Injectors 252 are schematically shown which inject materials such, as a silicon carbide matrix material, into spaces between the fibers in the woven layers. This may be utilized in the FIG. 4A step to provide 100% of the desired densification, or only some percentage. As an example, this initial step may be utilized to form between 10 and 90% of a desired densification.

One hundred percent densification may be defined as the layers being completely saturated with the matrix and about the fibers. Complete saturation may be difficult to achieve in practice.

As shown in FIG. 4B, the entire BOAS 204 is then formed with the additional layers, and having the overwrap plies 220 wrapping over the hook portions 222/224 and the reinforcement portion 210, and then additional densification occurs to all of these areas.

In another method, the FIG. 4A step could be eliminated, and the entire densification process occur in a single step. That is, rather than forcing member 210 as an intermediate product and then performing the FIG. 4B steps about this intermediate product 210, the entire BOAS can be formed at one time with the steps of FIG. 4B.

The same FIG. 4A/4B process may be useful for the FIG. 3A BOAS.

Returning to FIGS. 3 and 3B, spaces 158/156 and 228 between the laminates may be filled with loose fibers, and in the densification process these will also be filled to harden.

In addition, it can be seen that the hooks 106 and 108 do not extend in a direction which is perpendicular to the vertical, or parallel to the axis of rotation Z (see FIG. 2). Rather, the angle A is at some intermediate angle between 20 and 70 degrees relative to an upper surface 300 of the BOAS, and radially inward of the hook.

In embodiments the angle A may be between 20 and 70 degrees. Outer surface 226 of hooks 106/108 are curved, not sharp cornered. This positioning facilitates the assembly of the BOAS, as will be explained below.

FIG. 5 shows BOAS 104 having hooks 106 with 108 and a notch 240 that will catch on a tab on an attachment block to resist rotation.

Figure 6:
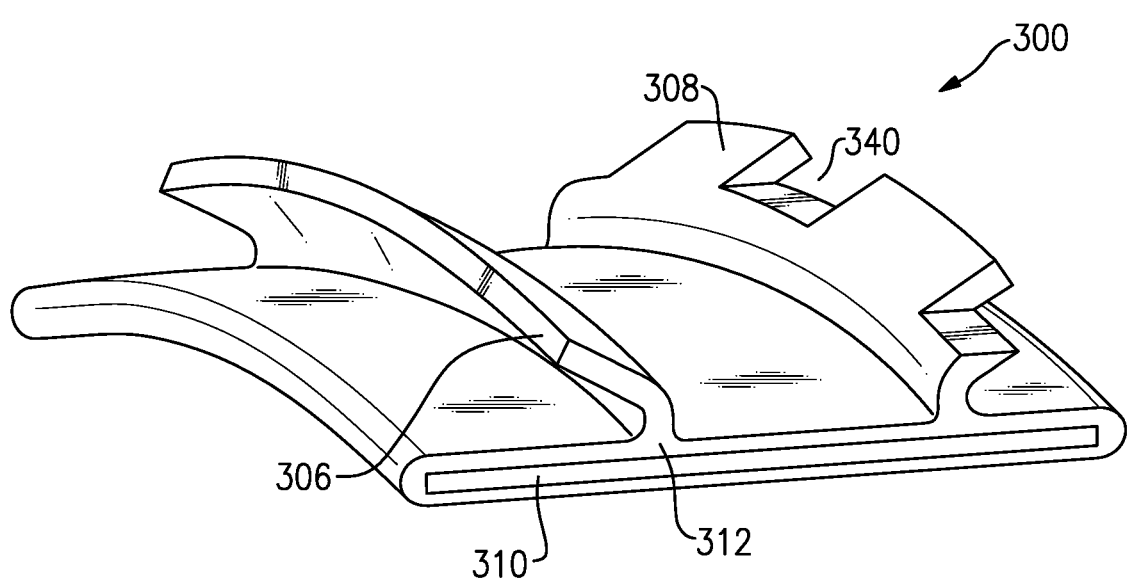
FIG. 6 shows an alternative embodiment blade outer air seal.

BOAS 300 as shown in FIG. 6 has its hooks 306 and 308 extending circumferentially to the edges 312. The reinforcement layer 310 is shown in this figure.

BOAS formed according to this disclosure provide beneficial operation due to the additional stiffness from the reinforcement layer. Options such as the pre-densification of FIG. 4A ensure that the central web will be of a desired rigidity, which might not occur if the inner layers were not adequately densified.

A method of forming a blade outer air seal could be said to include the steps providing an inner reinforcement member formed of a plurality of layers fibrous woven structure. A densification material is injected into the fibrous woven structure and about fibers within the fibrous woven structure. Outer overwrap layers are wrapped around the inner reinforcement member. A densification matrix about fibers is injected in the fibrous woven overwrap structure.

A BOAS and method as described above is disclosed and claimed in copending U.S. patent application Ser. No. 16/055,636, filed Aug. 6, 2018 and entitled "Blade Outer Air Seal Reinforcement Laminate."

As can be appreciated, items formed of CMC laminate have beneficial characteristics, and the methods described above provide powerful design options for forming such components. However, there are challenges with incorporating certain structures that would be desirable in gas turbine engine components into these laminate based structures.

Figure 7:
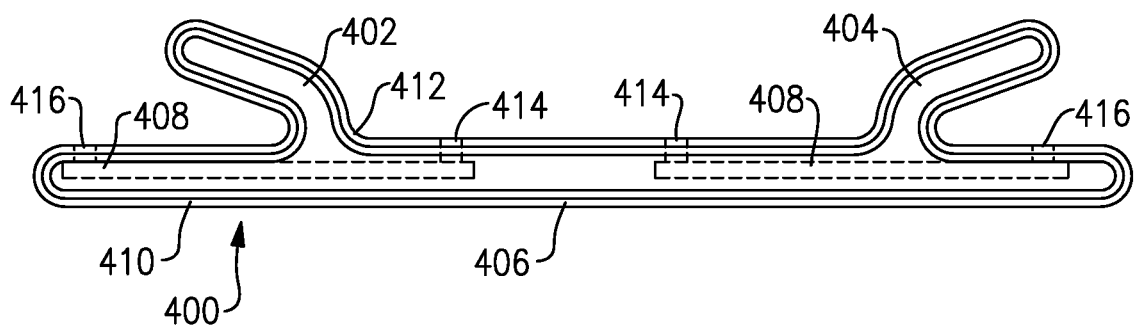
FIG. 7 shows a blade outer air seal according to this disclosure.

FIG. 7 shows a BOAS 400 which may be formed of laminate and generally as utilizing methods described above. The hook portion 402 and the hook portion 404 are shown as well as a central web 406. However, internal cooling circuits 408 are shown at both forward and aft ends of the BOAS 400. Inlets 414 and outlets 416 to circuits 408 are shown. As shown, there is an overlap laminate and such that there are laminate 410 radially inward of the cooling circuits 408 and at least one laminate 412 radially outward of the cooling circuits 408. Forming such a BOAS would be difficult utilizing known methods for forming laminated components. Notably, while a BOAS, in particular, is described, the teachings of this disclosure may extend to other gas turbine engine components.

Figure 8A:
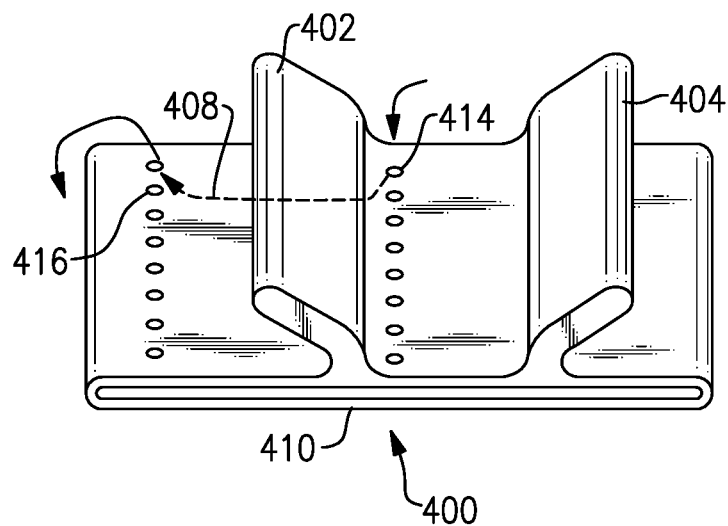
FIG. 8A is a perspective view of the FIG. 7 blade outer air seal.

FIG. 8A shows the BOAS 400 having the hook portions 402 and 404. The circuit 408 is shown interconnecting an inlet 414 and an outlet 416. The cooling airflow is generally in an axial direction in this disclosed embodiment and form a point intermediate hook 402 and 404, and to a location outward of hooks 402/404.

Figure 8B:
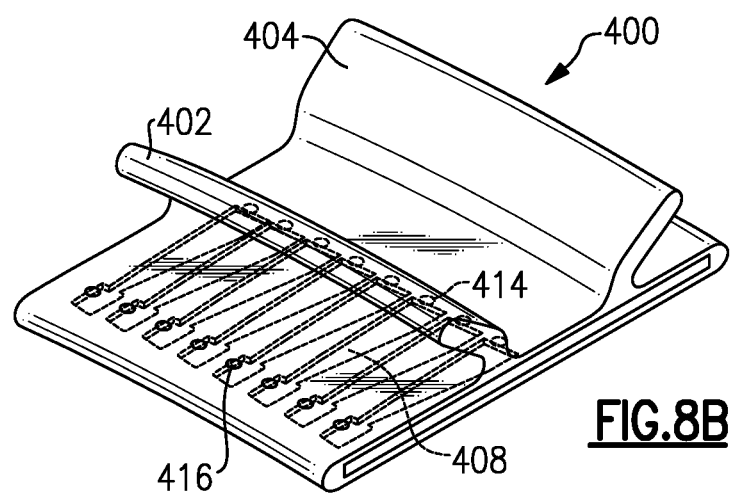
FIG. 8B shows some internal structure of the FIG. 8A blade outer air seal.

As shown in FIG. 8B, the cooling circuits 308 are shown in phantom and have a relatively complex shape. The shape will be described in more detail below. To form such a product, a method will now be disclosed.

Figure 9A:
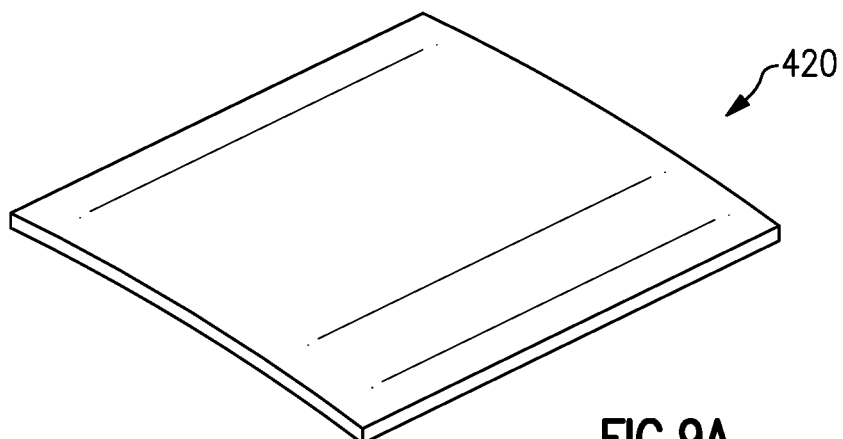
FIG. 9A shows a first method step to form the FIG. 8A/8B blade outer air seal.

FIG. 9A shows an initial formed intermediate product 420 as an initial method step. This is not unlike the concept described above wherein an intermediate series of laminations is initially prepared.

Figure 9B:
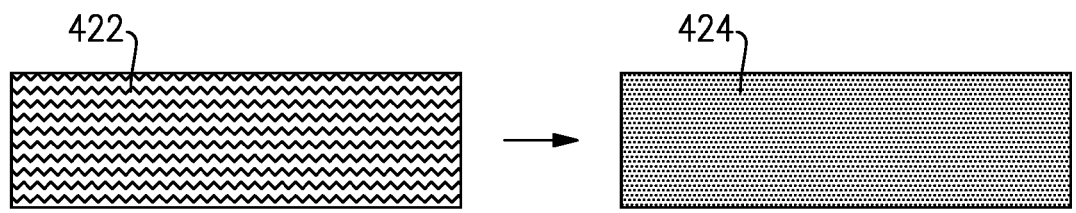
FIG. 9B shows a subsequent method step to form the FIG. 8A/8B blade outer air seal.

As shown in FIG. 9B, these laminates or plies are layered together as shown at step 422. Then, they are densified at step 424 and as described in more detail above.

Figure 10A:
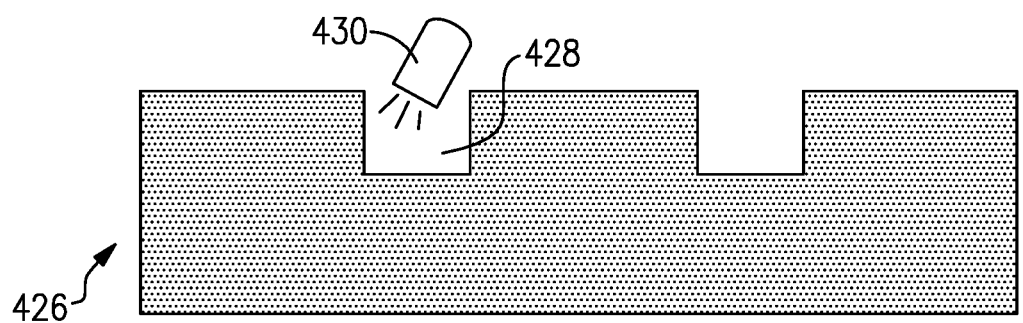
FIG. 10A shows a subsequent method step to form the FIG. 8A/8B blade outer air seal.
Figure 10B:
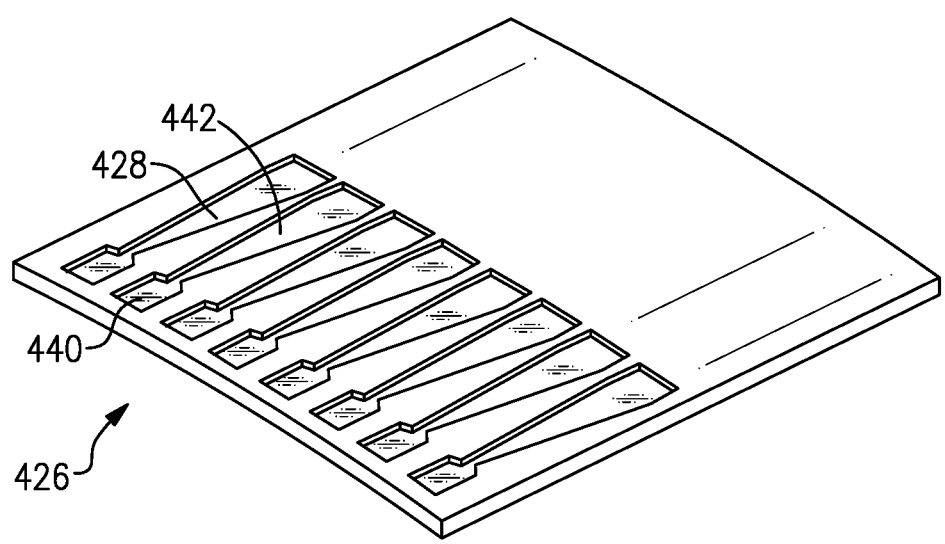
FIG. 10B shows detail of an intermediate product for forming the FIG. 8A/8B blade outer air seal.

FIG. 10A shows a subsequent method step. In this step 426, an ultrasonic machine 430 ultrasonically forms circuit channels 428 into the outer layer or outer layers of the intermediate structure 420. As shown in FIG. 10B, an intermediate product after the FIG. 10A step has circuits with an outlet end 440 and inlet end which extends in a generally triangular cross-section 442.

These intermediate circuits 428 can thus be formed in any number of complex shapes and sizes utilizing modern ultrasonic methods. However, it should be understood that other manufacturing techniques may be utilized to form the circuits in this intermediate product.

Figure 11:
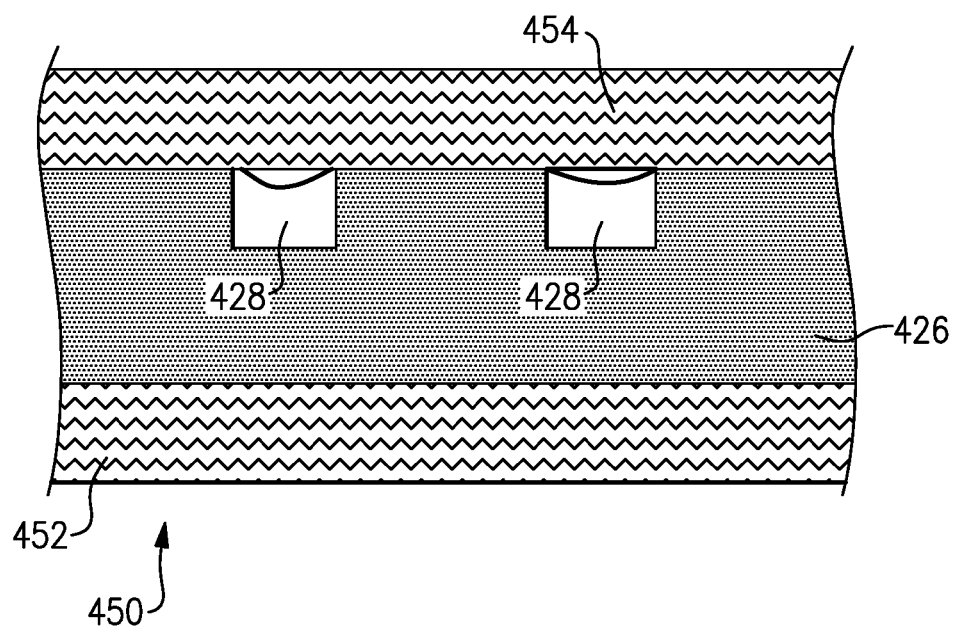
FIG. 11 shows a subsequent step to form the FIG. 8A/8B blade outer air seal.

In FIG. 11, in a subsequent step outer layers 454 and inner layers 452 are placed around the intermediate internal layer 426. This is shown at step 450.

While separate layers 454 and 452 are shown, as illustrated above, there may be an overlap layer that extends along both inner and outer locations. The intermediate circuits 428 are thus enclosed in this step.

Figure 12A:
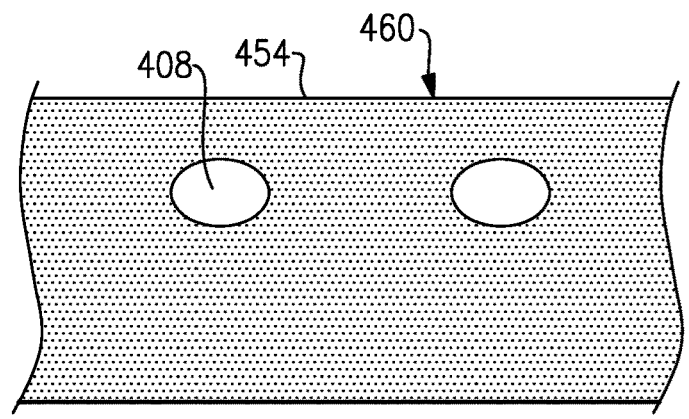
FIG. 12A shows a subsequent step to form the FIG. 8A/8B blade outer air seal.

As shown in FIG. 12A, in a subsequent method step this intermediate product 450 is then densified at step 460. The final circuits 408 remain.

Figure 12B:
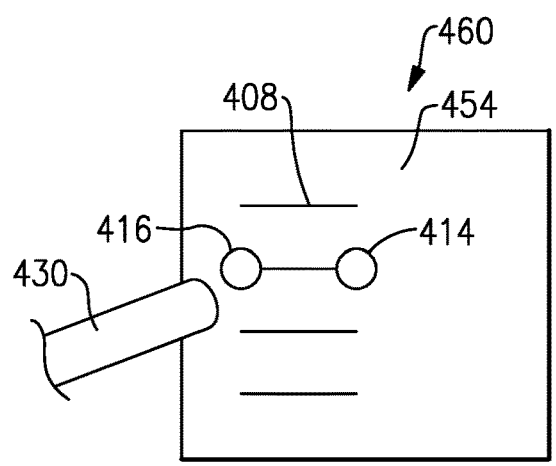
FIG. 12B shows a final step to form the FIG. 8A/8B blade outer air seal.

FIG. 12B shows a subsequent method step wherein the ultrasonic machine 430 now forms the holes 414 and 416 through the radially outer layer or layers 454.

Figure 12C:
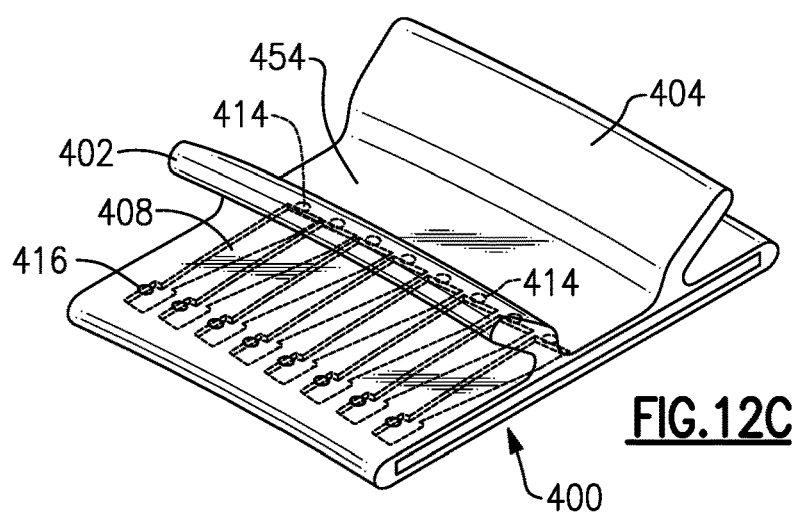
FIG. 12C shows a final blade outer air seal, partially in phantom.

Finally, as shown in FIG. 12C, the final component 400 remains.

The shape dimension and other aspects of the cooling circuit, as well as the number of cooling circuits, can be determined to achieve desired cooling properties once the overall conditions to be faced by the BOAS are known.

A method of forming a gas turbine engine component could be said to include the steps of: (a) forming an intermediate portion; (b) forming cooling circuit structure into at least an outer layer of the intermediate portion; (c) providing an outer layer over the formed cooling circuits to close off the cooling circuits, such that there are laminate on both a radially inner and a radially outer side of the cooling circuits; and (d) forming an inlet an outlet to the cooling circuits.

As may be known, the BOAS are also formed to have a circumferential are about the axis Z, such that even when not mounted in a gas turbine engine, there is a radially inner and a radially outer side to the BOAS.

Although a method and component embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of forming a gas turbine engine component comprising the steps of:
    (a) forming an intermediate portion;
    (b) forming cooling circuit structure into at least an outer layer of said intermediate portion;
    (c) providing an outer layer over said formed cooling circuits to close off said cooling circuits, such that there are laminate on both a radially inner and a radially outer side of said cooling circuits; and
    (d) forming an inlet and an outlet to said cooling circuits through said outer layer;
    wherein said intermediate portion includes a plurality of laminate;
    wherein at least one inner layer is also added inward of said intermediate portion in step (c); and
    wherein an overwrap layer provides both said inner and outer layer.

2. The method as set forth in claim 1, wherein said component is a blade outer air seal.

3. The method as set forth in claim 1, wherein step (d) is performed by an ultrasonic machine.

4. The method as set forth in claim 3, wherein there are a plurality of separate cooling circuits formed within said intermediate layer.

5. The method as set forth in claim 4, wherein there is an individual inlet and an individual outlet for each of said plurality of cooling circuits.

6. The method as set forth in claim 5, wherein said cooling circuit has a non-rectangular shape.

7. The method as set forth in claim 1, wherein said intermediate portion and said layers are formed of a ceramic matrix composite.

8. The method as set forth in claim 1, wherein step (b) is performed by an ultrasonic machine.

9. The method as set forth in claim 8, wherein step (d) is performed by an ultrasonic machine.

10. The method as set forth in claim 1, wherein there are a plurality of separate cooling circuits formed within said intermediate layer.

11. The method as set forth in claim 1, wherein said cooling circuit has a non-rectangular shape.

12. A gas turbine engine comprising:
    a compressor section and a turbine section, said turbine section including at least one rotor and at least one blade extending radially outwardly from said rotor to a radially outer tip;
    a blade outer air seal assembly positioned radially outwardly of said radially outer tip of said blade, said blade outer air seal having forward and aft hooks, and said forward and aft hooks being supported on forward and aft seal hooks of an attachment;
    said blade outer air seal formed of a plurality of laminate layered with a central web formed of a plurality of laminate members including an inner reinforcement member, and an outer overwrap that wraps around said inner reinforcement member; and
    said blade outer air seal forward of a plurality of laminate layers, with internal cooling circuits formed in at least one of said layers, with at least one other layer radially outward of said at least one layer, and closing off said internal cooling circuit.

13. The gas turbine engine as set forth in claim 12, wherein an inlet and an outlet is provided through said at least one other layer radially outward of said at least one layer, for each of said internal cooling circuits.

14. The gas turbine engine as set forth in claim 13, wherein there being an intermediate portion forming said internal cooling circuits, and said at least one other layer radially outward of said at least one layer being positioned outwardly of said intermediate portion.

15. A blade outer air seal comprising:
a blade outer air seal assembly having forward and aft hooks;
said blade outer air seal formed of a plurality of laminate layered with a central web formed of a plurality of laminate members including an inner reinforcement member, and an outer overwrap that wraps around said inner reinforcement member; and
said blade outer air seal forward of a plurality of laminate layers, with internal cooling circuits formed in at least one of said layers, with at least one other layer radially outward of said at least one layer, and closing off said internal cooling circuit.

16. The blade outer air seal as set forth in claim 15, wherein an inlet and an outlet is provided through said at least one other layer radially outward of said at least one layer, for each of said internal cooling circuits.

17. The blade outer air seal as set forth in claim 16, wherein there being an intermediate portion forming said internal cooling circuits, and said at least one other layer radially outward of said at least one layer being positioned outwardly of said intermediate portion.

* * * * *